Feb. 3, 1953  C. T. LYON  2,627,445
EQUIPMENT FOR THE PREPARATION AND STORAGE OF FOOD
Filed Oct. 24, 1945  7 Sheets-Sheet 1

Clifford T. Lyon INVENTOR.
BY
Spencer, Mazall, Johnston & Cook
ATTORNEYS.

Feb. 3, 1953     C. T. LYON     2,627,445
EQUIPMENT FOR THE PREPARATION AND STORAGE OF FOOD
Filed Oct. 24, 1945     7 Sheets-Sheet 2

Clifford T. Lyon INVENTOR.
BY Spencer, Marzall, Johnston & Cook
ATTORNEYS.

Feb. 3, 1953     C. T. LYON     2,627,445
EQUIPMENT FOR THE PREPARATION AND STORAGE OF FOOD
Filed Oct. 24, 1945     7 Sheets-Sheet 4
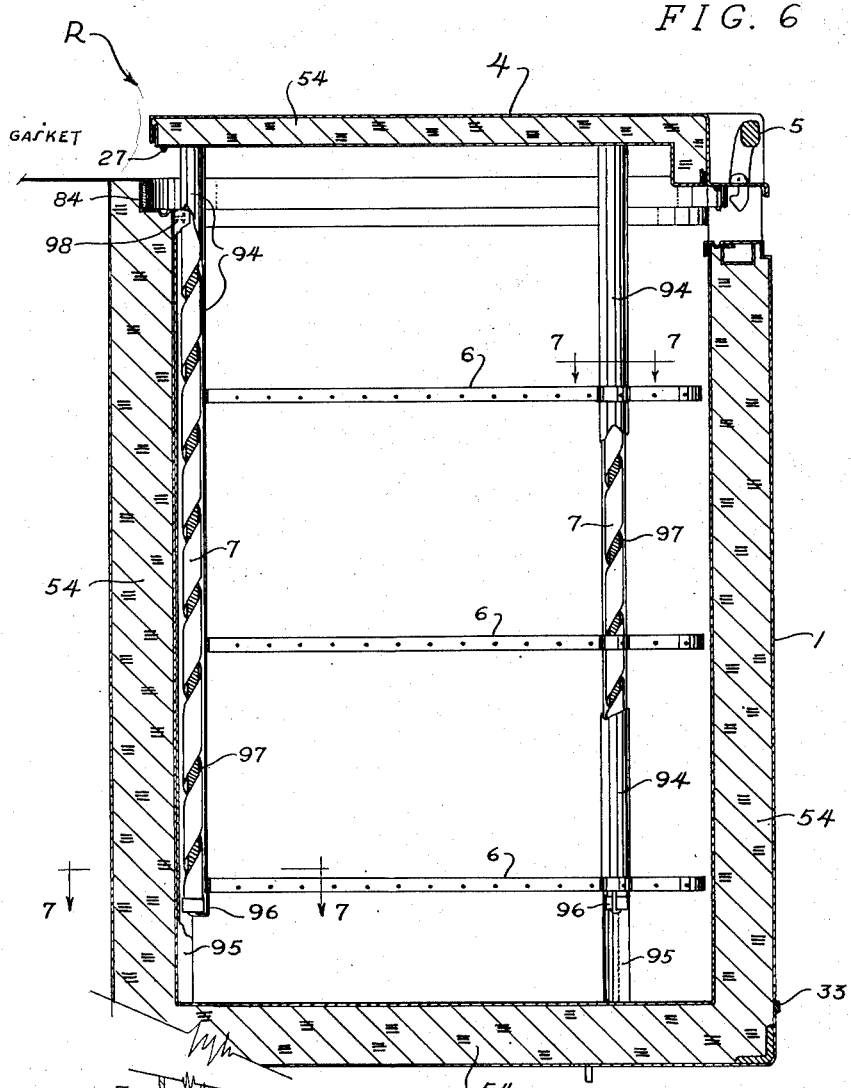
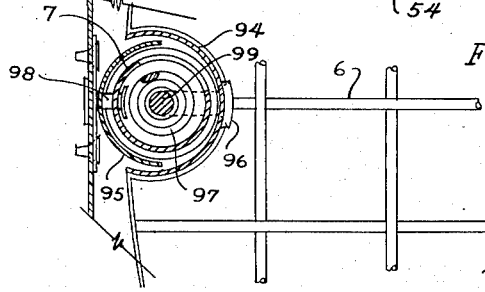

Feb. 3, 1953 — C. T. LYON — 2,627,445
EQUIPMENT FOR THE PREPARATION AND STORAGE OF FOOD
Filed Oct. 24, 1945 — 7 Sheets-Sheet 5
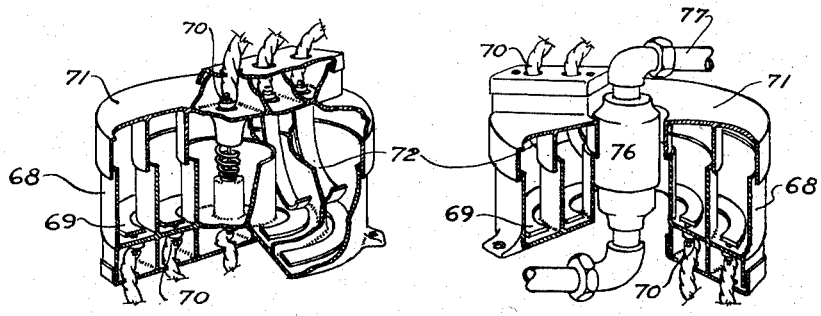
FIG. 8
FIG. 9
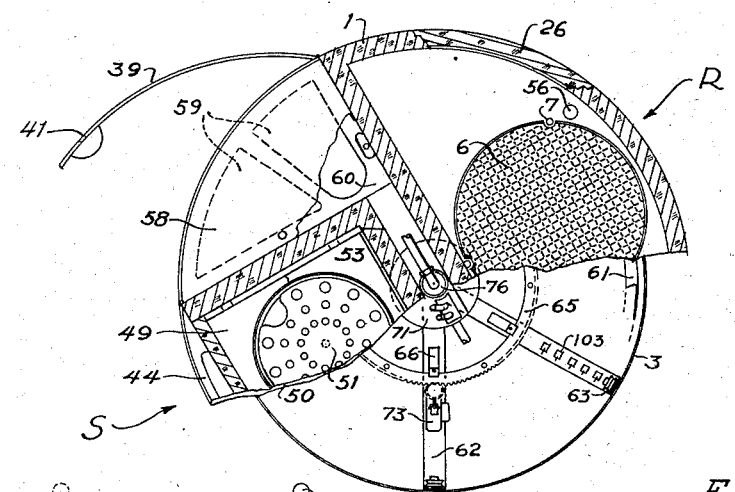
FIG. 10
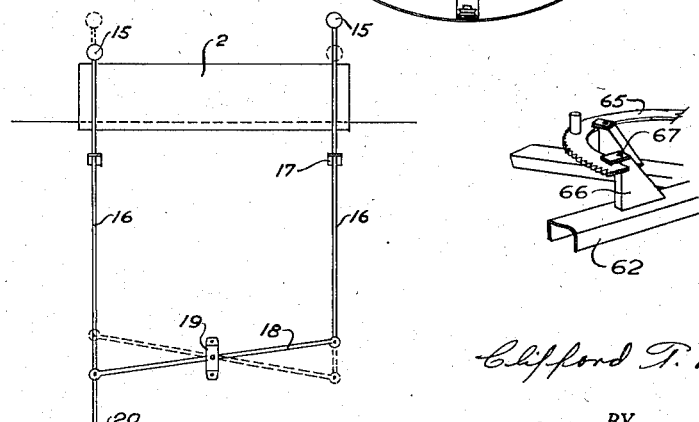
FIG. 11
FIG. 12
Clifford T. Lyon INVENTOR.
BY Spencer, Marzall, Johnston & Cook
ATTORNEYS.

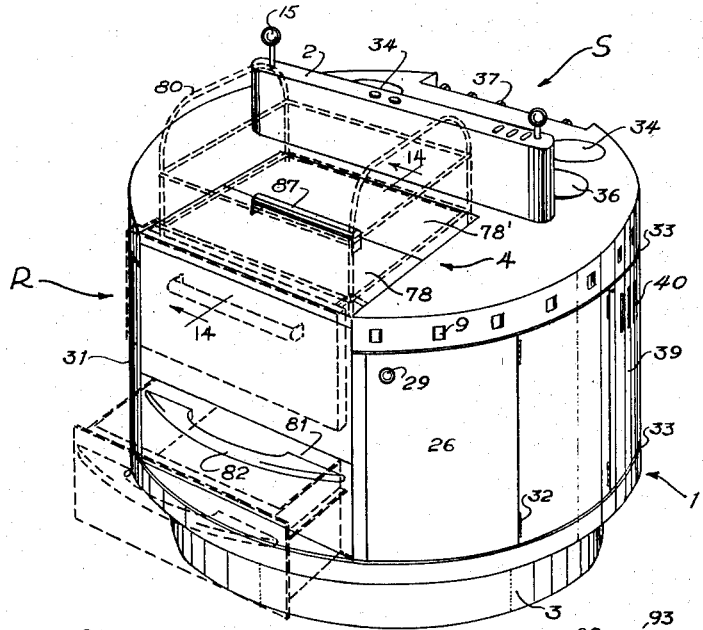
FIG. 13
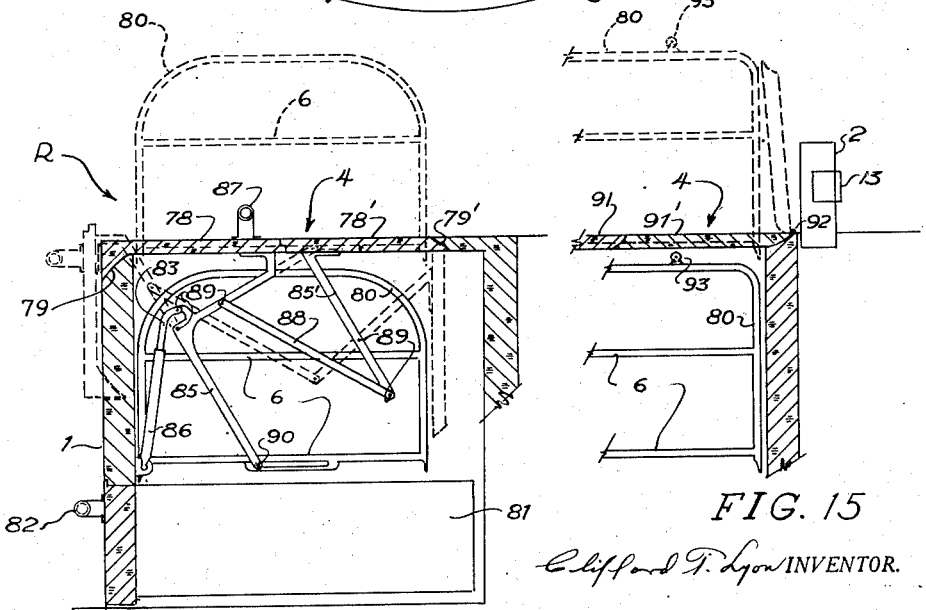
FIG. 14
FIG. 15
Clifford T. Lyon INVENTOR.
BY Spencer, Margall, Johnston & Cook
ATTORNEYS.

UNITED STATES PATENT OFFICE

2,627,445

EQUIPMENT FOR THE PREPARATION AND STORAGE OF FOOD

Clifford T. Lyon, Chicago, Ill.

Application October 24, 1945, Serial No. 624,128

1 Claim. (Cl. 312—223)

The present invention relates in general to domestic appliances and has more particular reference to a compact apparatus combining a plurality of appliances, such as a cooking stove and a refrigerator, in a single unit occupying minimum floor space.

An important object of the invention is to provide a combined appliance and utility unit wherein the several appliances face outwardly of the unit, whereby the unit may be approached from all sides, as when placed toward the center of a kitchen area, thereby affording accessibility to all of the included appliances and utilities; a further object being to provide a combination unit having a plurality of facilities embodied therein to thereby achieve greater workability than is possible where separate utilities are installed in a cooking area along the walls thereof; a still further object being to incorporate convenient shelves, drawers and storage spaces in the unit, together with appliances, such as a stove and refrigerator.

Another important object of the invention is to provide an appliance combination of the character mentioned embodying a rotatable or revoluble structure whereby any selected one of a plurality of appliances embodied therein may selectively be oriented to a desired operating position, thereby affording space economy.

Another important object is to provide an appliance combination wherein the several appliances and utilities are embodied as a substantially cylindrical unit turnable about its vertical axis.

Another object is to conserve space within a kitchen area, while providing adequate cooking and refrigerating facilities; a further object being to afford greater flexibility in the placement of a stove and refrigerator, together with associated utilities including utensil drawers, storage cabinets, and appliances, such flexibility being accomplished by incorporating the appliances and utilities in a single unit, thereby allowing the same to be installed in any desired convenient position in a cooking area, as toward the center thereof or against a wall, or in a corner or angle.

A further object of the invention is to provide economical refrigerating means by the use of a novel shelving arrangement wherein storage shelves may be elevated to accessible position, from a refrigerated storage chamber, through the top of the refrigerator unit, thus creating a suction, in the refrigerator chamber, which tends to retain cold air within the chamber instead of spilling chilled air therefrom, as is the case when a conventional side-opening refrigerator door is opened.

Another object is to provide an upwardly opening refrigerator whereby stored articles may be elevated to a comfortable reaching position for removal, or vice-versa, thereby eliminating the necessity of stooping or bending when loading or unloading the refrigerator; a further object being to incorporate a cooking stove with such a top-opening refrigerating unit so that articles may be transferred from the refrigerator immediately onto the working top of the stove.

Another important object of the invention is to provide, in combination with a cooking stove having one or more heater elements, demountable means for supporting a mixing and stirring device whereby the same may be used in position over any one of the heater elements, as desired.

Among the other important objects and advantages of the invention is to provide a readily accessible set of handles for operating latching means for preventing undesired rotary movement of the combination unit; to provide an electric motor having an automatic locking device for rotating the combined unit at will; to provide means for turning the combined unit to any desired position under the control of a push button panel; to suitably insulate the refrigerator in order to provide a dead air space enclosing the same and thereby prevent sweating; to suitably insulate the stove and associated oven in order to prevent heat loss; to provide breaker strips and other suitable insulation between the stove and refrigerator units to prevent the circulation of heat and cold therebetween through metallic parts; to provide a combination unit that is efficient in service and attractive in appearance, and to accomplish savings in manufacturing costs by combining a plurality of household utilities as a single unit with accompanying economies in the cost of fabrication, storage, crating, shipping, installation, advertising and selling; a still further object being to afford a novel kitchen utility that will afford opportunities for the improvement in the architectural design of buildings, more particularly the design and structural arrangement of kitchen or other cooking areas.

The foregoing and numerous other important objects, advantages, and inherent functions of the invention will become apparent as the invention is more fully understood from the following description, which, taken in conjunction with the accompanying drawings, discloses a preferred embodiment of the invention.

Referring to the drawings:

Fig. 6 is a sectional view taken substantially along the line 6—6 in Fig. 1 to illustrate a preferred refrigerator construction;

Fig. 7 is a sectional view taken substantially along the line 7—7 in Fig. 6;

Figs. 8 and 9 are partially cut away perspective views, respectively, of a revolving electrical connection box and of a revolving electrical and gas connection box, which may be incorporated in the unit;

Fig. 10 is a sectional view taken horizontally through the unit, parts of the structure being broken away to reveal structural details;

Fig. 11 is a fragmentary perspective view of turning and locking mechanism;

Fig. 12 is a diagrammatic showing of manually operable latch means that may be incorporated in the unit;

Fig. 13 is a perspective view of a unit having a modified refrigerator structure;

Fig. 14 is a sectional view taken substantially along the line 14—14 in Fig. 13 to illustrate a preferred refrigerator arrangement;

Fig. 15 is a fragmentary sectional view on the line 14—14 in Fig. 13 showing a modified arrangement.

Figure 1:
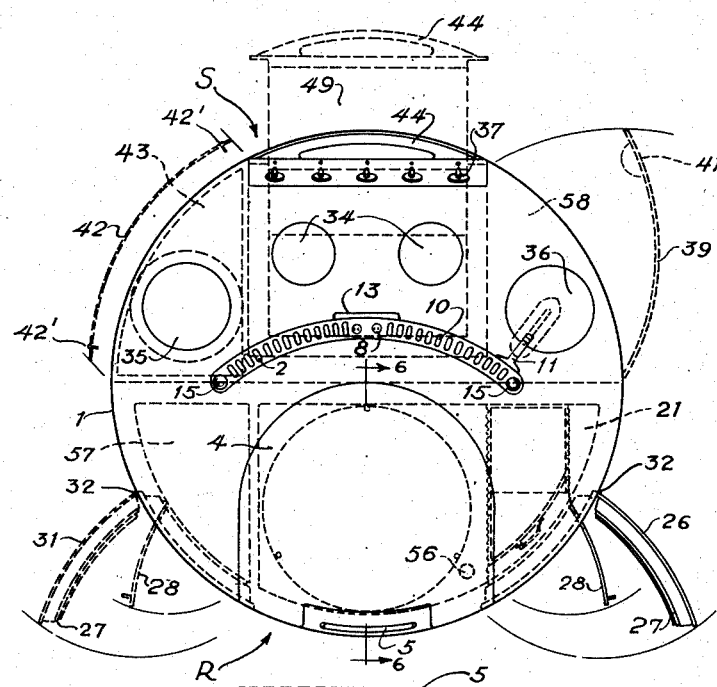
Fig. 1 is a top plan view of a combination kitchen appliance unit incorporating a refrigerator and a cook stove in accordance with the present invention.
Figure 2:
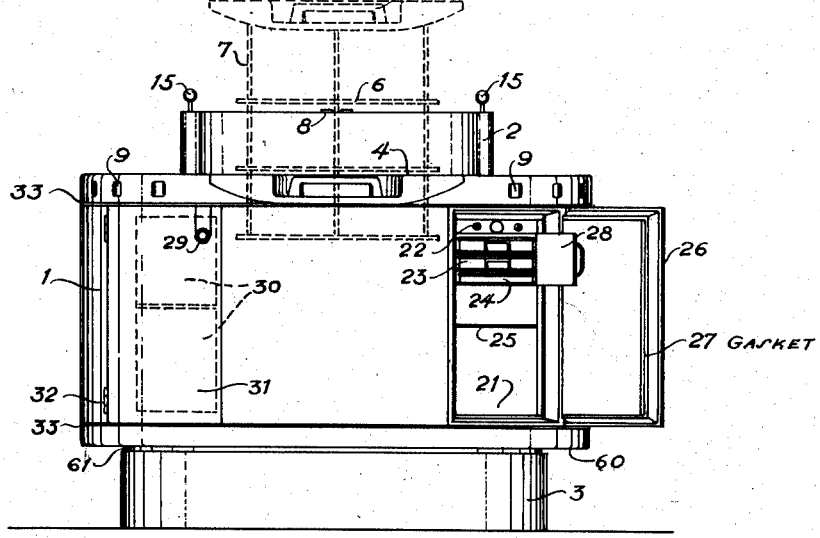
Figs. 2 and 3 are elevation views of the opposite sides of the unit.
Figure 3:
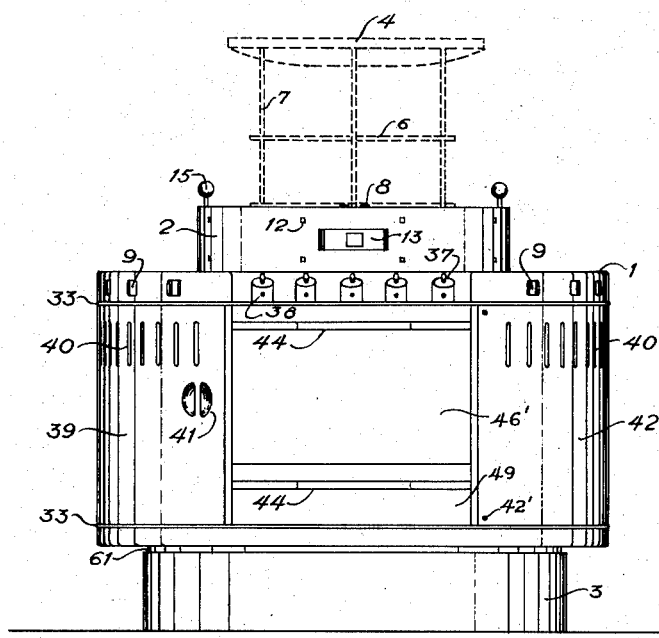
Figure 4:
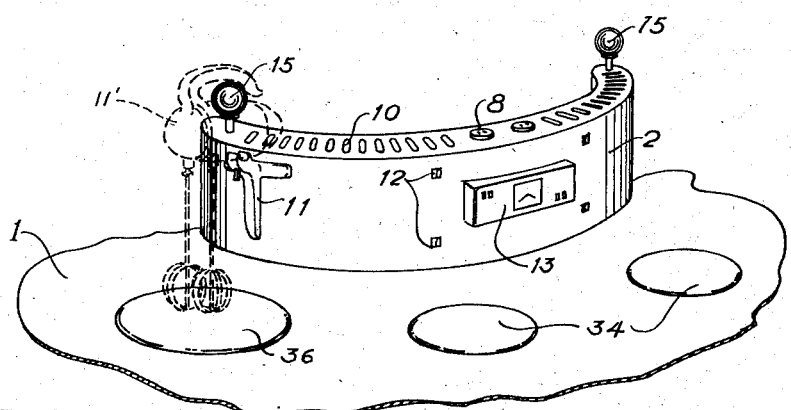
Fig. 4 is a perspective view of an oven ventilator forming a part of the unit.

To illustrate the invention, the drawings show a combination kitchen appliance unit comprising a preferably cylindrical body or shell 1 forming a box-like frame in which is incorporated a refrigerator R and a stove S, the refrigerator and stove, respectively, occupying the opposite half portions of the frame.

The refrigerator section R may comprise a central cool chamber and lateral cold storage chambers 21 and 57 on the opposite sides of the cool chamber. The central cool chamber preferably opens upwardly at the top of the frame 1 and is normally closed by cover means 4 having an operating handle 5. The laterally disposed chambers 21 and 57 are provided with doors 26 and 31 preferably opening outwardly of the sides of the frame 1.

The stove section S preferably comprises heater elements 34 and 36, and a cooking well 35 disposed at and facing upwardly of the top of the frame 1. The stove section also preferably includes a central portion forming an oven compartment 46 and a broiler compartment 49 in superposed relationship in the central portions of the stove section. On one side of such central portion, the stove section may include a convenient storage compartment 58 for cooking utensils. On the opposite side of said central section, the frame 1 may be formed with a chamber 43 adapted to house a compresser, condenser, and associated refrigerating equipment for circulating a suitable refrigerant to and from an evaporator, or evaporators, located in the refrigerator section R for the purpose of cooling the cold storage chambers 21 and 57 and the central cool chamber of the refrigerator.

It will be seen from the foregoing that the unit compactly disposes a refrigerator and stove while allowing access to either, as well as to the utensil storage chamber 58, so that the unit, if desired, may be located as toward the central portions of a kitchen or other service area, thereby giving access to the unit from all sides thereof, to meet the exigencies of a preferred kitchen arrangement. If so employed, the unit may be stationarily mounted on any suitable base.

The unit, however, is adapted for placement in any convenient location in a kitchen area, and may in fact be tucked into any available space, such as a corner or bay, or even in a small closet, thereby substantially enhancing its utilitarian flexibility. To provide such flexibility, the present invention contemplates the mounting of the unit on a suitable support base for rotation about the central, preferably vertical, axis of the frame 1 whereby either the stove or the refrigerator, as well as the compartments 21, 43, 57 and 58 may be selectively brought into position facing a working space on one side of the unit. To this end, the frame 1, may be mounted for rotation on a suitable base 3, and manually releasable means may be provided for latching the frame against turning movement on the base, such means being operable by suitable knobs 15 exposed at the top of the frame. Suitable hand-holds 9 may also be provided on the frame 1 to facilitate the manual rotation of the frame 1 on its supporting base, and motor means 73 also may be provided for turning the unit, if desired.

The base 3 may be of any suitable or preferred construction. As shown more particularly in Figs. 5 and 10, the base 3 may comprise a framework constructed of angle iron or other suitable structural support elements 62.

The supports 62 may radiate from the central portions of the base and may be provided with downwardly extending legs and feet 64 at their outer ends. The feet 64 may comprise floor plates drilled and tapped for fastening to the floor. The base also may be enclosed within a preferably cylindrical shell of sheet material to hide its structural features, to afford a solid and substantial appearance, and also to prevent, so far as possible, the accumulation of debris within the base. The base may be, and preferably is, of lesser diameter than the frame in order that the latter may overhang the base whereby to improve the appearance of the unit and to afford a toe space for the convenience of the operator of the device.

The frame 1 is turnably supported upon the base 3 and to this end may be provided with an annular track member 61 comprising a dependent circular flange formed on the bottom of the frame 1 in position to rollingly engage preferably grooved rollers 63 journaled in suitable brackets formed on and preferably at or near the outer ends of the base members 62.

The members 62 may be welded or otherwise joined together at the central portions of the base to form a central hub provided with a central opening through which gas or electrical conduits may extend into a connection box having a bottom section 68, mounted on the base, and a cooperating top section 71 on the frame 1. The base also may form a mounting for the driving motor 73 having driving connection with the frame 1 to turn the same. As shown the bottom of the frame may be fitted with a ring gear 65 having driving engagement with a pinion driven by the motor, means 74 being provided for locking the pinion and hence also the ring gear and the frame 1 against rotation except when the motor is energized as by the closure of a switch preferably disposed in a remote control panel 75. The base 3 may also include guide brackets 66 and clamp means 67 cooperating with the ring gear 65 for aiding in installing the frame 1 on the base 3 and to secure the parts rotatably together in operative relationship. To this end the brackets 66 may cooperate with the inner edge of the ring to center the same on the base, while the clamp means 67, comprising lugs on the brackets, may serve to hold the ring and attached frame down upon the base without, however, binding the same or interferring with the free rotation of the frame on the base.

As shown more particularly in Figs. 8 and 9, gas and/or electric connections are provided through the connection box comprising the cooperating box portions 68 and 71, which are preferably made of molded plastic material. The box portion 68 is mounted centrally on the stationary base and may comprise a cylindrical open top box having concentric sleevelike partitions defining a central chamber and one or more circular chambers concentrically disposed outwardly of the central chamber. The box is mounted on the base with the axis of the box coinciding with the axis of rotation of the frame 1 on the base 3.

As shown in Figure 8 the central and concentric chambers of the box may contain insulated bus conductors 69 mounted therein and electrically connected with an external electrical power source, as by terminals 70 extending through the bottom of the box. The box portion 71 is fastened to the bottom of the frame 1 in position to cover the open top of the box portion 68. The portion 71 may have dependent flanges slidingly overlapping the cylindrical partitions of the portion 68. The portion 71 forms an insulated mounting for contact brushes 72 adapted to wipingly engage and make sliding electrical contact with the bus conductors 69. The brushes are electrically connected with conductors leading to the stove and refrigerator as by suitable terminals 70 extending through the box top 71.

As shown more especially in Fig. 9 the central chamber of the connection box may be used to house a rotary pipe coupling 76, in co-axial alinement with the rotary axis of the unit. This coupling may be connected with a supply pipe in the base 3 and with a delivery pipe 77 for the supply of gas or other fluid through the coupling 76 to the stove and/or refrigerator.

Ordinarily the refrigerator will be operated by an electric motor driven compressor in the chamber 43 and powered by the sliding electric connections shown in Fig. 9, while gas supplied through the coupling 76 will serve as fuel for the stove. It is within the contemplation of the invention, however, to supply a refrigerant, through the coupling 76, for the operation of the refrigerator and to operate the stove electrically; or to operate both the stove and refrigerator by electricity and to use the coupling 76 to supply water at a convenient faucet, at the top of the unit.

The frame 1 may be of any suitable or preferred construction. As shown, it may comprise suitable angle iron members forming a basic framework carrying sheet metal plates forming walls defining the refrigerating and oven compartments and the several storage chambers. The walls of the oven and broiler and of the refrigerator chamber are preferably double walls provided with insulation 54 therebetween and heat insulating breaker strips 84 may be, and preferably are, provided to prevent heat transfer between the inner and outer shells forming the oven broiler and refrigerated chambers in the frame 1.

The top surface of the shell 1 is preferably turned down over the side walls and contains the indented handhold slots 9 in the downwardly turned extension. If desired, however, the unit may be fitted with a projecting handle comprising a continuous, curved pipe encircling the frame and secured thereto by suitable brackets. The top of the frame may also include downwardly slanting portions at the top front of the oven section to provide a convenient mounting for cooking element controls 37, which are mounted on such inclined frame portion and presented at a readily visible inclination facing outwardly and upwardly of the frame. The top surface of the frame 1 is formed with openings into which the cooking elements 34, 35 and 36 are fitted, and may also be provided with an upwardly facing opening in the refrigerator section giving access to the central cool chamber thereof. Between the refrigerator and stove sections, the top of the frame may be formed with an opening for a ventilator 2.

The base of the frame 1 is preferably formed as a sheet metal plate 60, the same being cut out at selected places 59, as in the bottom of the compartment 58, to afford access to those parts within the base which may require service. These openings may be normally closed by a removable bottom shelf or panel in the compartment 58. The base plate extends upwardly around the exterior walls of the frame a distance substantially equal to the downward extension of the top surface. Both top and bottom plates may be attached to the exterior walls, in any preferred fashion, the attached edges of the top and bottom plates being preferably concealed under trim bands 33 to enhance the appearance of the unit and conceal the joints.

As shown in Figs. 5, 6, 7, 13, 14 and 15, the central cool chamber of the refrigerator section may contain shelving 6 preferably comprising shelves of wire mesh or other foraminous material, the shelves being mounted in a frame suspended on the cover 4 which closes the preferably upwardly facing opening of the cool chamber. The shelf mounting frame may be formed in any suitable or preferred manner. As shown, Figs. 5, 6, and 7, the frame may comprise hollow upright members 94 fastened to the underside of the cover 4 adjacent the edges thereof and depending therefrom, the shelves 6 being fastened or secured in any convenient or preferred fashion, in superposed relationship on the uprights 94. The uprights 94 partially enclose each a helically wound strip 7, which in turn encloses a counterbalancing spring 97. The helically wound member forms a tube providing a helical groove extending from one end of the tube to its other end.

The uprights 94 are provided with brackets 96 connecting the same with the tube 7 at the lower ends thereof, said tubes being free to turn on the brackets. The brackets also carry a rod-like axis member 99, which extends therefrom through the spring 97, said members 99 being connected, at their bracket remote ends, on the cover 4, thereby affording support for the springs 97. Opposite each of the uprights 94, the inner wall of the cool chamber is provided with cooperating channel shaped guides 95, which enclose the outwardly facing sides of the tubes 7. At the upper end of the cool chamber, spring mounting lugs 98 are mounted in position extending, through the helical slot of the member 7, to engage the upper end of the spring 97, the lower end of the spring being connected at the lower end of the shelf support structure. The tubes 7 will be caused to rotate by the fingers 98 when the shelf structure is raised or lowered in the cool chamber, thereby maintaining a thrust tension in the spring which assists in raising and maintaining the shelves at any desired height. The springs are adapted to compensate for any weight placed on the shelves as well as unequal distribution of weight caused by placing articles at random on the several shelves.

Figure 5:
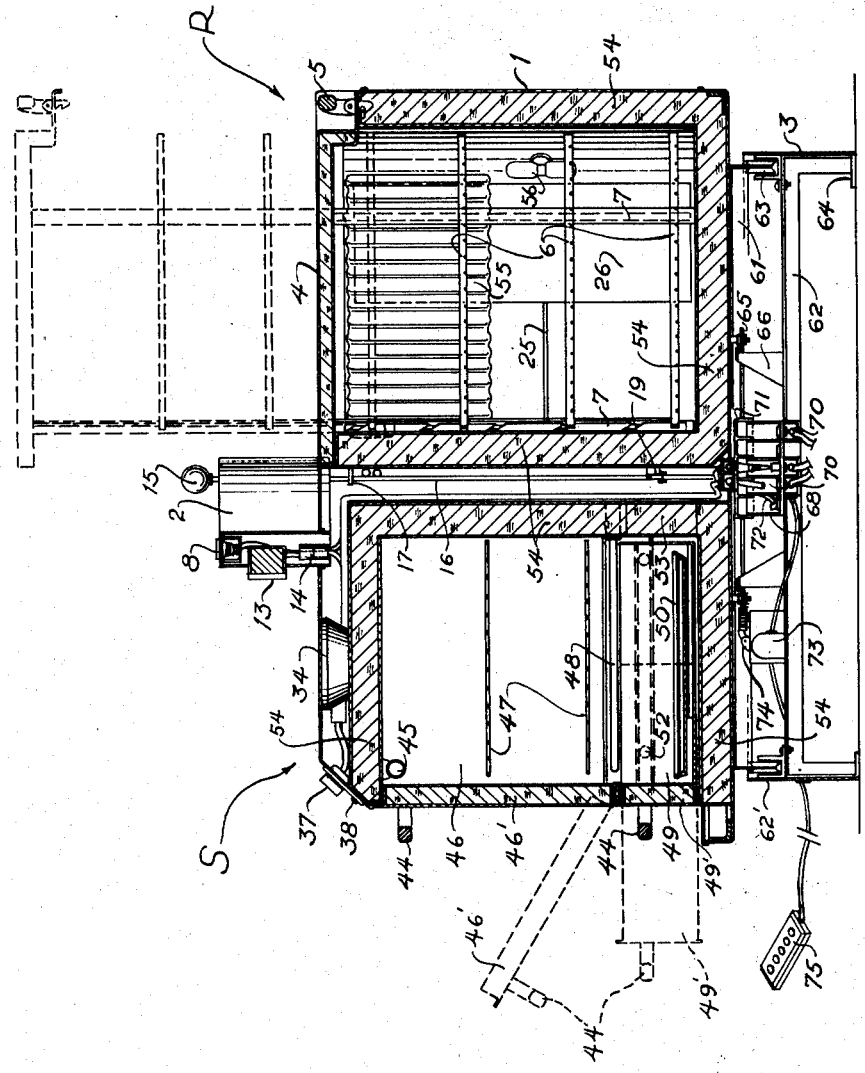
Fig. 5 is a sectional view taken vertically through the combination unit.

The cool chamber, in the form illustrated in Figs. 5, 6 and 7, is of cylindrical shape and the cover 4 is of circular configuration, preferably fitting into a depressed cavity in the top wall of the unit at the upper end of the cool chamber. The operating handle 5 is preferably disposed at one side of the cover which may be flagged down to provide a recess for receiving the handle, which is preferably curved to follow the perimeter of the unit. The handle may be provided with a spring latch adapted to cooperate with a suitable keeper mounted in the walls of the cool chamber.

As shown more particularly in Figs. 13, 14 and 15, the cool chamber may be of rectangular configuration and the cover means 4 may comprise cooperating rectangular doors forming pivoted top lids on which the shelves 6 may be supported. In this embodiment, the substantially cylindrical body of the unit is preferably formed with a flat surface, the upper end of which, as shown in Fig. 14, may be beveled, as at a forty-five degree angle, to form a ledge 79 for engaging the correspondingly beveled edge of one of the rectangular cover members 78 when in closed position, a similar beveled ledge 79' being formed for engaging the correspondingly beveled edge of the flat top 78' along the side of the cool chamber opening remote from the beveled edge 79.

When the doors 78 and 78' are in closed position their meeting edges have interfitting relationship to provide an airtight cover for the cool chamber. The shelves 6 are interconnected in a suitable framework 80 whereby the shelves may be projected as a unit from the cool chamber when the doors 78 and 78' are opened. To this end, the shelf frame 80 is interconnected with the doors by means of a suitable mechanism comprising levers pivoted, as at 69, and including an angular lever 85 having an end forming sliding pivot connection 90 with the shelf frame 80 at the medial portions thereof, the other end of said lever 85 being secured to the underside of the door 78. The lever 85 is pivoted, at its mid-portion, on the inner walls of the cool chamber and is also connected with the movable member 83 of an extensible, preferably spring actuated counterbalance device 86, the stationary member or sheath of which may be pivotally mounted on the inner walls of the cool chamber at or near the bottom thereof. The other door 78' carries a lever member 85' on its underside, said lever member being pivoted intermediate its length upon the inner walls of the cool chamber. At its door remote end, the lever 85' is connected, by means of a link 88, with the lever 85. The door 78, also, may be provided with a convenient operating handle 87 whereby the doors may be opened to the dotted line position shown in Fig. 14, the door 78 projecting outwardly of the cool chamber and extending down along the flattened wall of the unit, and the door 78' extending downwardly within the rear portions of the cool chamber. When in open position, the shelves 6 will be projected to the dotted line position shown in Fig. 14.

The lower portions of the cool chamber, in Figs. 13 and 14, may comprise a drawer 81 provided with an operating handle 82 and adapted to open laterally outwardly of the unit at the lower portions of the flattened sides thereof, as shown in dotted lines in Fig. 13.

A modified shelf and door arrangement is shown in Fig. 15 wherein the cover means 4 comprises cooperating members 91 and 91' hinged, as at 92, along opposed top edges of the cool chamber for upwardly opening movement. In this embodiment, the shelf structure 80 may be provided with a lifting handle 93, suitable shelf counterbalancing means, comparable to the device 86 being preferably provided to aid in raising and maintaining the shelf structure in projected position.

If desired, the refrigerator section may be provided with an automatic light and ultraviolet radiator 56 to illuminate and sterilize the cool and cold storage spaces.

The refrigerator section R also includes the cold storage comparements 21 and 57, which are disposed in the unit preferably on opposite sides of the central cool chamber. These compartments may be provided with doors 26 and 31, respectively, opening on vertically disposed hinges 32 at the side of the frame 1. These doors may be fitted with suitable, preferably manually operable latches 29 for securing the same releasably in closed position. The doors 26 and 31, and likewise the cover member 4, are preferably of hollow construction comprising inner and outer panel members, which may be of metal, secured together in spaced relationship, as by suitable insulating breaker strips 84, similar to the strips which insulate the inner and outer wall members forming the cool chamber and the cold storage compartments 21 and 57. The spaces within the hollow doors also are preferably filled with insulation which may comprise rock wool, fiber glass, or other suitable insulation material, similar to the insulation 54 employed in the hollow walls of the stove and refrigerator compartments.

Both compartments 21 and 57 may be fitted with refrigerating units including a refrigerating unit in the compartment 21 for making ice cubes in trays 23, said unit being provided with a drip tray 24 and having adjustable temperature control means 22. Beneath the refrigerating unit the compartment 21 may be provided with shelves 25 to adapt the same for the reception of items, including bottled goods, for cold storage. The other cold storage chamber 57 may likewise be provided with shelving to adapt the same for use as a frozen food locker and, if desired, inner doors 28 and 30 may be provided for the several compartments of the locker as well as for the ice cube chamber 23. The refrigerating units in the chambers 21 and 57 may be and preferably are refrigerant evaporators 55 supplied with refrigerant from compressor-condenser equipment disposed in the compartment 43.

The stove section S comprises a centrally disposed stove and oven portion having heater elements 34 and 36, and an insulated cooker well 35 mounted in the top of the frame 1, the small elements 34 being preferably located centrally, with the cooking well 35 and the larger heater element 36 disposed on opposite sides of said centrally located elements 34. The stove may include suitable heat controls 37 disposed centrally of the stove portion and at the marginal edge of the top of the unit. The side wall of the unit centrally of the stove portion is preferably flattened, as shown more particularly in Figs. 1 and 5, to form the front of the stove section, the controls 37 being disposed on an angulated portion of the top wall of the unit at the upper end of said flattended side wall portion.

The heater elements and cooking well may, of course, be heated either by electricity or by gas, and the controls 37 according may comprise electrical switches or manually operable gas control valves; and the controls 37 may include pilot light facilities 38.

The central portions of the stove unit, beneath the heaters 34, may form an oven compartment 46 and a broiler chamber 49 in superposed relationship in the frame 1. The oven and broiler compartments may comprise a single chamber having hollow walls interconnected by suitable heat insulating breaker strips similar to the breaker strips 84; and the hollow walls of said chamber may be filled with insulation 54. The oven compartment is fitted with a suitable door 46' preferably supported on horizontal hinge means for opening movement downwardly and outwardly of the side of the frame 1. Preferably removable foraminous shelves 47 may be provided in the oven compartment 46 and, if desired, a lamp 45 may be mounted in the oven and adapted to light up the interior of the compartment 46 whenever the door 46' is opened. The broiler compartment is preferably fitted with a suitable drawer 49' adapted to be drawn outwardly of the flattened side wall of the stove section S, as indicated in dotted lines in Figs. 1 and 5.

The oven and broiler compartments may be provided also with heat elements 48 preferably disposed in position intermediate the compartments 46 and 49. The broiler drawer also may be fitted with a tray 50, which is preferably mounted for turning movement within the drawer. The drawer also may be provided with a removable broiling grid 51 and the drawer may be supported, in the broiler compartment, on rollers 52 riding in suitable tracks mounted on the opposite inner side walls of the broiler compartment. If desired, the rear wall of the broiler compartment may be provided with an opening closed by a removable insulated panel 53 for the purpose of giving access to the space between the rear walls of the oven and refrigerator sections in which the fuel and power supply conduits extend from the connection box centrally located on the bottom of the frame 1 and on the base 3.

Suitable handles 44 may be provided on the oven door 46' and on the broiler drawer 49'.

The frame 1, beneath the larger heater element 36 and on one side of the oven and broiler compartment, may provide a storage compartment 58 for the convenient reception of pots, pans, and like cooking utensils, said compartment having a door 39 opening outwardly of the side walls of the frame 1 and provided with a suitable grasping handle 41. On the other side of the stove unit, beneath the cooking well 35, the frame 1 may form a compartment 43 opening laterally on the frame 1 and normally closed by a removable panel 42 secured in place by suitable fastening members such as the set screws 42'. This compartment 43 may contain a compressor, condenser, and associated mechanism for circulating a suitable refrigerant to the evaporators or other cooling devices in the compartments 21 and 57 of the refrigerator section.

A removable ventilator top 2 comprising a hollow box-like shell may be mounted at the top of the unit in position extending transversely between the tops of the oven and refrigerator sections. This ventilator is mounted in a cut-out opening in the top wall of the unit and is preferably of semi-circular shape, as shown more particularly in Fig. 1. It is held in place by friction fit in the opening and is provided with a bead, which determines the depth at which it seats in the opening. Ventilating louvers are formed in the top of the ventilator 2 in order to allow for the circulation of air around the oven and broiler compartments, the storage compartment 58 and the compartment 43 in which the compressor and the evaporator of the refrigerating unit are mounted.

In order to allow for such ventilation of the compartments 43 and 58, the door 39 of the compartment 58 and the closure panel 42 of the chamber 43 may be provided with vent openings 40 so that ventilation air may be drawn into the compartments 43 and 58 through the openings 40 and thence circulated around the exterior wall of the oven and broiler compartment and upwardly through the openings 10 of the ventilation shell 2.

In addition to its ventilating function, the shell 2 provides a mounting for one or more electrical convenience outlets 8 and also provides a guide support for the operating handles or knobs 15 which control the rotating gear 65. To this end, as shown more particularly in Fig. 12 of the drawings, the knobs 15 are mounted on rods 16, which are slidingly supported in guides 17, in turn mounted on the outer rear wall of the refrigerating section, the rods 16 thus being disposed in the space between the back walls of the stove and refrigerator sections. The lower ends of the rods 16 are connected to the opposite ends of a connecting lever 18, which is fulcrumed medially between its ends in a bracket 19 mounted on the rear wall of the refrigerator section.

One of the rods 16 extends downwardly through an opening in the bottom of the frame 1 and is formed with a latch detent 20 in position to engage suitable toothed detent means on the base 3. By pressing one of the knobs 15 downwardly, the detent 20 may be lockingly engaged with suitable detent means formed on the base to thereby prevent the frame 1 from turning on the base 3. At the same time the other knob will be projected upwardly by the action of the lever 18. By pressing such other knob downwardly, the latch member 20 may be drawn upwardly from engagement with the keeper means to release the frame 1 for turning movement on the base.

The ventilating shell 2 also provides a mounting for an electric clock, illuminating lamps, temperature controls, and timer mechanism, indicated generally at 13, and also provides mounting lugs 12 adapted to receive a preferably removable bracket 11 on which to detachably mount an electric mixing device 11'. The mounting lugs 12 are preferably disposed opposite the heater elements 34 and 36 and the shell 2 is curved in a fashion to dispose the lugs equally distant from the corresponding heaters so that when the electric mixer is mounted on any of the lugs it will be in position to perform a mixing operation in proper alignment with the corresponding heater element. The ventilator shell 2 is thus removably supported on the top of the frame 1, electrical conductors being connected with the outlet plugs, clock, lamps, controls and timer device, through readily disconnectible electrical coupling means 14.

Figure 16:
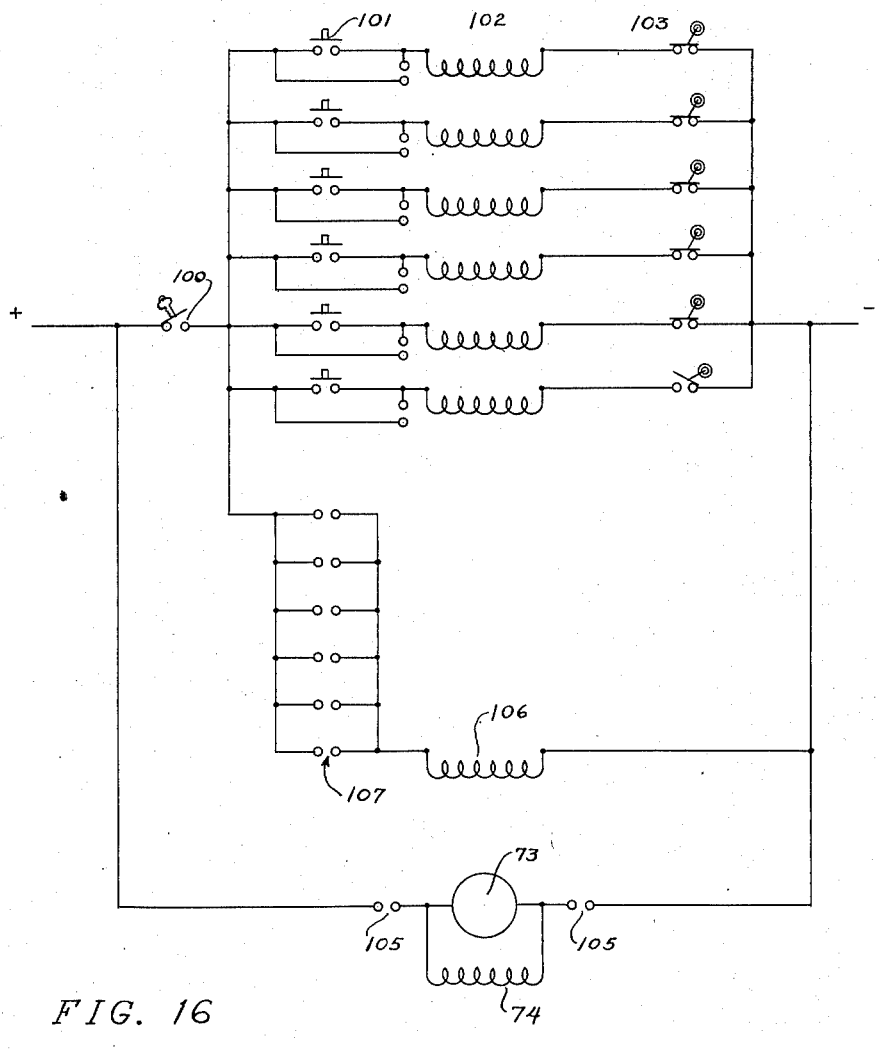
Fig. 16 is a diagram of electrical connections.

The apparatus is operated by the preferably fractional horsepower motor 73 having the gear reduction drive 65 and built-in brake 74 for controlling the turning movement of the frame 1. The drive gear of the motor, engaging with the ring gear 65, may rotate the combined stove and refrigerator unit to any and all desired positions. Control for the rotation of the unit may be achieved by the electrical circuits shown in Fig. 16 under the control of a key switch 100. This key switch and the position selecting push buttons 101 may be mounted on the remote control plate or panel 75 which may be placed in any convenient position. By pressing a selected one of the push buttons 101, the unit may be caused to rotate on its axis and to stop at the position selected. Ordinarily six selector buttons, as shown, will afford all of the stopping positions necessary in a unit containing the six elements illustrated, namely, the stove, the storage compartment 58, the three refrigerator chambers, and the equipment compartment 43.

The pressing of a selected push button 101 closes its circuit which is thereafter held in closed position by the relay 102 connected in circuit with the push button, there being a relay operatively associated with each push button. In each relay and push button circuit there is included a microlimit switch 103. The several switches 103 are physically mounted in spaced relationship on the base 3 of the unit in position to be engaged and opened by switch actuating finger means on the turnable frame 1 in order to open the circuit and discontinue turning movement of the frame when it has reached the selected position.

The circuits containing the selector buttons 101, the relays 102, and the limit switches 103, are arranged in parallel relationship and are interconnected in series with a power source through the key switch 100. The motor 73 and the operating coil of the locking device 74 are connected in parallel relationship with the power source through suitable normally open starter switch contact means 105, which may be closed when an associated starter coil 106 is energized. This starter coil 106 is interconnected with the power source through the key switch 100 and relay contacts 107, each of which is closed by a corresponding one of the relays 102 when energized upon the closure of the associated selector button 101. The locking device 74 consists of a solenoid which operates when energized to remove a latching detent out of contact with the teeth of the drive gear associated with the ring gear 65.

It will be seen from the foregoing description that the present invention provides a combination rotatable stove and refrigerator unit providing insulated spaces in which low refrigerator temperatures and high stove temperatures may be created and maintained without interference from each other or from externally caused conditions, wherein food and other items may be stored, prepared, or cooked. The combined unit provides means whereby access may be had to all storage, preparation and cooking facilities without requiring the operator to move from one position, the apparatus operating in an easy and convenient manner as a result of the facilities provided for controlled rotation of the unit. Since access may be had to the cold storage compartment by the elevation of a part of the refrigerator, a partial vacuum is created within the cool chamber of the refrigerator which tends to retain cold air therein. This feature in combination with the placement of the most commonly used articles upon the upper shelves of the refrigerator substantially eliminates the wastage of cold air from, and the induction of warm air into the insulated refrigerator chamber. Since access may be had to the compartment by elevating a portion of the refrigerator, an advantageous condition is achieved in that an ideal working height is obtained, the raising of the refrigerator shelves making it possible to place and remove articles at a most comfortable position, without stooping or bending, below the operating top of the unit.

It is also apparent that, through the use of a neat, compact and sightly ventilator, a combined stove and refrigerator unit is provided that is convenient to use, commodious, and capable of maintaining cooking and cooling processes equal to, if not exceeding, the utility of completely separate stoves and refrigerators in that the improved ventilator serves to maintain a circulation of air between the warm oven and the cool refrigerator compartments, and further affords the facility of mounting a mixing device over any heater element of the stove. The ventilator arrangement, further, affords a means for conveniently mounting devices in an attractive fashion at the top of the unit.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed comprising a preferred embodiment for the purpose of demonstrating the invention.

The invention is hereby claimed as follows:

A combination stove and refrigerator unit comprising a frame mounted for rotation about a vertical axis, a refrigerating zone in said frame disposed on one side of said axis, a cooking zone in said frame disposed on the opposite side of said axis from said refrigerating zone, means for automatically rotating said unit about said vertical axis including a circular ring gear attached to said frame, a drive gear mounted for engagement with said ring gear, an electric motor adapted to drive said drive gear, an electrical circuit connected to said motor and a source of electrical energy, circuit opening and closing means in said circuit for energizing and de-energizing said circuit to remotely control the operation of said motor and rotate the frame to a predetermined position, and electrically actuated latching means cooperatively associated with said motor to latch the unit against turning movement when the motor is not in operation.

CLIFFORD T. LYON.

(References on following page)

REFERENCES CITED

The following references are of record in the file of this patent:

UNITED STATES PATENTS

| Number | Name | Date |
|---|---|---|
| 461,756 | Hubbard | Oct. 20, 1891 |
| 526,144 | Carver | Sept. 18, 1894 |
| 845,707 | Randolph | Feb. 26, 1907 |
| 1,227,935 | Robertson | May 29, 1917 |
| 1,575,988 | Moller | Mar. 9, 1926 |
| 2,000,981 | Parsons | May 14, 1935 |
| 2,060,435 | Vincent | Nov. 10, 1936 |
| 2,078,612 | Shisler | Apr. 27, 1937 |
| 2,092,282 | Love | Sept. 7, 1937 |
| 2,093,856 | Wales | Sept. 21, 1937 |
| 2,096,256 | Mitchell | Oct. 19, 1937 |
| 2,215,372 | Howeth | Sept. 17, 1940 |
| 2,222,124 | Sherman | Nov. 19, 1940 |
| 2,279,558 | Clerc | Apr. 14, 1942 |
| 2,309,513 | Kramer | Jan. 26, 1943 |
| 2,314,248 | Rutledge | Mar. 16, 1943 |
| 2,344,650 | Sloat | Mar. 21, 1944 |
| 2,392,635 | Bletz | Jan. 8, 1946 |
| 2,396,992 | Evans | Mar. 19, 1946 |
| 2,400,135 | Quinn | May 14, 1946 |